(12) United States Patent
Gleitsmann

(10) Patent No.: US 8,987,983 B2
(45) Date of Patent: Mar. 24, 2015

(54) PRODUCTION OF PHOSPHOR LAYERS USING ALKALI SILICATES

(75) Inventor: Tobias Gleitsmann, Michendorf (DE)

(73) Assignee: OSRAM GmbH, Munich (DE)

( * ) Notice: Subject to any disclaimer, the term of this patent is extended or adjusted under 35 U.S.C. 154(b) by 0 days.

(21) Appl. No.: 13/996,395

(22) PCT Filed: Nov. 30, 2011

(86) PCT No.: PCT/EP2011/071401
§ 371 (c)(1),
(2), (4) Date: Jun. 20, 2013

(87) PCT Pub. No.: WO2012/084440
PCT Pub. Date: Jun. 28, 2012

(65) Prior Publication Data
US 2013/0270992 A1  Oct. 17, 2013

(30) Foreign Application Priority Data
Dec. 21, 2010  (DE) .................. 10 2010 063 756

(51) Int. Cl.
| | | |
|---|---|---|
| H01J 1/62 | (2006.01) | |
| H01J 63/04 | (2006.01) | |
| F21V 9/00 | (2006.01) | |
| C09K 11/02 | (2006.01) | |
| H01J 9/22 | (2006.01) | |
| H01J 29/22 | (2006.01) | |
| H05B 33/20 | (2006.01) | |
| C09K 11/08 | (2006.01) | |
| G02B 26/00 | (2006.01) | |

(52) U.S. Cl.
CPC . *F21V 9/00* (2013.01); *C09K 11/02* (2013.01); *H01J 9/223* (2013.01); *H01J 29/22* (2013.01); *H05B 33/20* (2013.01); *C09K 11/0838* (2013.01); *G02B 26/008* (2013.01)
USPC ............... 313/483; 362/84; 428/690

(58) Field of Classification Search
CPC .......... G02B 1/04; G02B 1/105; G02B 5/003; G02B 5/0278; G02B 5/3033; G02B 1/111; G02B 26/008; G02B 5/0215; G02B 5/0231; G02B 5/0284; G02B 5/045; G02B 5/30; G02B 5/3025; C09K 11/7734; C09K 11/666; C09K 11/7774; C09K 3/1463; C09K 11/02; C09K 11/7792; C09K 11/0838; H01J 9/223; H05B 33/20; H05B 33/14; B01J 19/10; B01J 37/0215; C01B 33/20; F21V 9/00; F21V 9/16

See application file for complete search history.

(56) References Cited

U.S. PATENT DOCUMENTS

| | | | |
|---|---|---|---|
| 2,647,841 A * | 8/1953 | Perl et al. .................. | 427/73 |
| 3,416,940 A | 12/1968 | Graham | |
| 3,681,222 A | 8/1972 | Gupton | |
| 3,763,051 A * | 10/1973 | Speigel et al. .......... | 252/301.36 |
| 5,744,907 A | 4/1998 | Chadha et al. | |
| 5,808,409 A * | 9/1998 | Matsuda et al. .............. | 313/486 |
| 2002/0079824 A1* | 6/2002 | Mikami et al. ................ | 313/461 |
| 2003/0124247 A1 | 7/2003 | Rasmussen et al. | |
| 2005/0146261 A1* | 7/2005 | Hayakawa et al. .......... | 313/479 |
| 2008/0049345 A1 | 2/2008 | Niwa | |

FOREIGN PATENT DOCUMENTS

| | | |
|---|---|---|
| CN | 202025182 | 11/2011 |
| WO | WO 02/090464 | 11/2002 |
| WO | WO 2008/041363 | 4/2008 |

OTHER PUBLICATIONS

Yang et al., "Blue CuxS coated ZnS: Ag, Cl phosphor as potential field emission display material", Journal of Vacuum Science and Technology: Part A, AVS/AIP, Melville, NY, vol. 16, No. 6, pp. 3443-3448, Nov. 1, 1998.

M. Yokoyama et al., "Red SrTiO3:Pr, Al phosphor as potential field emission display material", Journal of Vacuum Science and Technology, Part A, AVS/AIP, Melville, NY, vol. 18, No. 5, pp. 2472-2476, Sep. 1, 2000.

* cited by examiner

*Primary Examiner* — Donald Raleigh
(74) *Attorney, Agent, or Firm* — Cozen O'Connor

(57) ABSTRACT

A method for producing a phosphor layer or a phosphor body, comprising: applying a suspension comprising at least one solid phosphor and at least one alkali silicate to a substrate surface or into a mold to create a phosphor layer or a phosphor body; and curing the phosphor layer or the phosphor body.

13 Claims, 5 Drawing Sheets

US 8,987,983 B2

PRODUCTION OF PHOSPHOR LAYERS USING ALKALI SILICATES

RELATED APPLICATIONS

This is a U.S. national stage of International application No. PCT/EP2011/071401 filed on Nov. 30, 2011.

This patent application claims the priority of Japanese application no. 10 2010 063 756.4 filed Dec. 21, 2010, the disclosure content of which is hereby incorporated by reference.

FIELD OF THE INVENTION

The present invention relates to a method for producing phosphor layers or phosphor bodies using a suspension of at least one solid phosphor in a liquid alkali silicate/water mixture, to the suspensions used in this method and to the use thereof for producing phosphor layers or phosphor bodies and also to optical components or lamps that comprise the phosphor layers or phosphor bodies produced in such a way.

BACKGROUND OF THE INVENTION

For remote phosphor applications, i.e. applications in which phosphor and the light source, for example an LED, laser or laser diode, are spatially separate, thin phosphor layers are applied to surfaces (substrate), mechanically fixed with binders and bonded (air, immersion, etc.) to an optical system (lenses, collimators, etc.).

The use of binders is necessary, since the phosphors, which are usually in powder form, do not form mechanically stable layers, i.e. abrasion- and scratch-resistant layers, without the additional use of binders.

A problem with the use of binders for layer formation or stabilization is that these binders may interact with the phosphors and thereby adversely influence optical and thermal characteristics. Moreover, the binders must themselves be thermally and optically stable and not show any aging characteristics. For this reason, the use of an inert, optically transparent, thermally and optically stable binder is a precondition for the creation of stable and more durable phosphor layers.

The phosphors are excited to emit by light sources, for example blue diode lasers, of high power density (several W/mm$^2$). The phosphor region may comprise one or more phosphors that are capable of at least partially transforming incident laser light or excitation light into wavelengths of transformed or converted light. The high thermal losses (Stokes) occurring in the conversion lead to heat being introduced into the phosphor layer. If these temperatures become too high, for example due to insufficient heat removal, thermally induced changes to the optical characteristics (emission wavelength, conversion efficiency, thermal quenching, etc.) may occur, or ultimately the destruction of the phosphors or the layer itself. This degeneration of the phosphor layer may be caused both by the phosphor and the binder. For this reason, the phosphor layer should be made such that heat can be optimally removed from it, in order to avoid the thermal destruction of the phosphors and the binder.

At present, silicones are used as binder matrices for optical excitation (for example LEDs). These do not allow excessive light power outputs (power densities of several W/mm$^2$) or necessitate further technological expenditure (for example phosphor-coated rotating color wheels to reduce the light exposure time).

The coating process is limited by the type of the substrate materials. For instance, high-temperature processes are inconceivable on many plastics and metallic materials (for example aluminum) on account of their melting temperatures. On the other hand, alternatively available ceramic materials with good thermal conductivity (for example AlN) involve increased technological and financial expenditure. The known phosphor/silicone mixtures are usually applied directly to metallic substrates. These metallic substrates may additionally have a cooling function.

One object of the present invention is therefore to provide a method for producing phosphor layers that overcomes the known disadvantages and makes it possible to produce mechanically and thermally stable phosphor layers.

SUMMARY OF THE INVENTION

This and other objects are attained in accordance with one aspect of the present invention directed to a method for producing a phosphor layer or a phosphor body, the method comprising:
  applying a suspension comprising at least one solid phosphor and at least one alkali silicate to a substrate surface or into a mold to create a phosphor layer or a phosphor body; and
  curing the phosphor layer or the phosphor body.

In a further aspect, the invention is directed to an optical component which comprises a phosphor layer that has been produced by means of the method according to the invention. The invention likewise concerns a lamp, in particular an LED lamp, a laser or a color wheel comprising a phosphor layer produced by a method according to the invention or an optical component according to the invention.

In yet a further aspect, the invention relates to a suspension comprising at least one liquid aqueous alkali silicate and one or more solid phosphors and to the use of such a suspension for producing a phosphor layer or a phosphor body.

BRIEF DESCRIPTION OF THE DRAWINGS

In FIGS. 1a) and 1d) to 1k), the substrate (103) is optically dense, in FIG. 1b) it is optically transparent. Likewise represented are configurational variants of the distribution of the phosphor particles (102) within the alkali-silicate phosphor layer (101) ((d)-(g)).

In FIG. 2c), the upper substrate (205) is optically dense, the lower substrate (204) optically transparent.

DETAILED DESCRIPTION OF THE DRAWINGS

Figure 1:
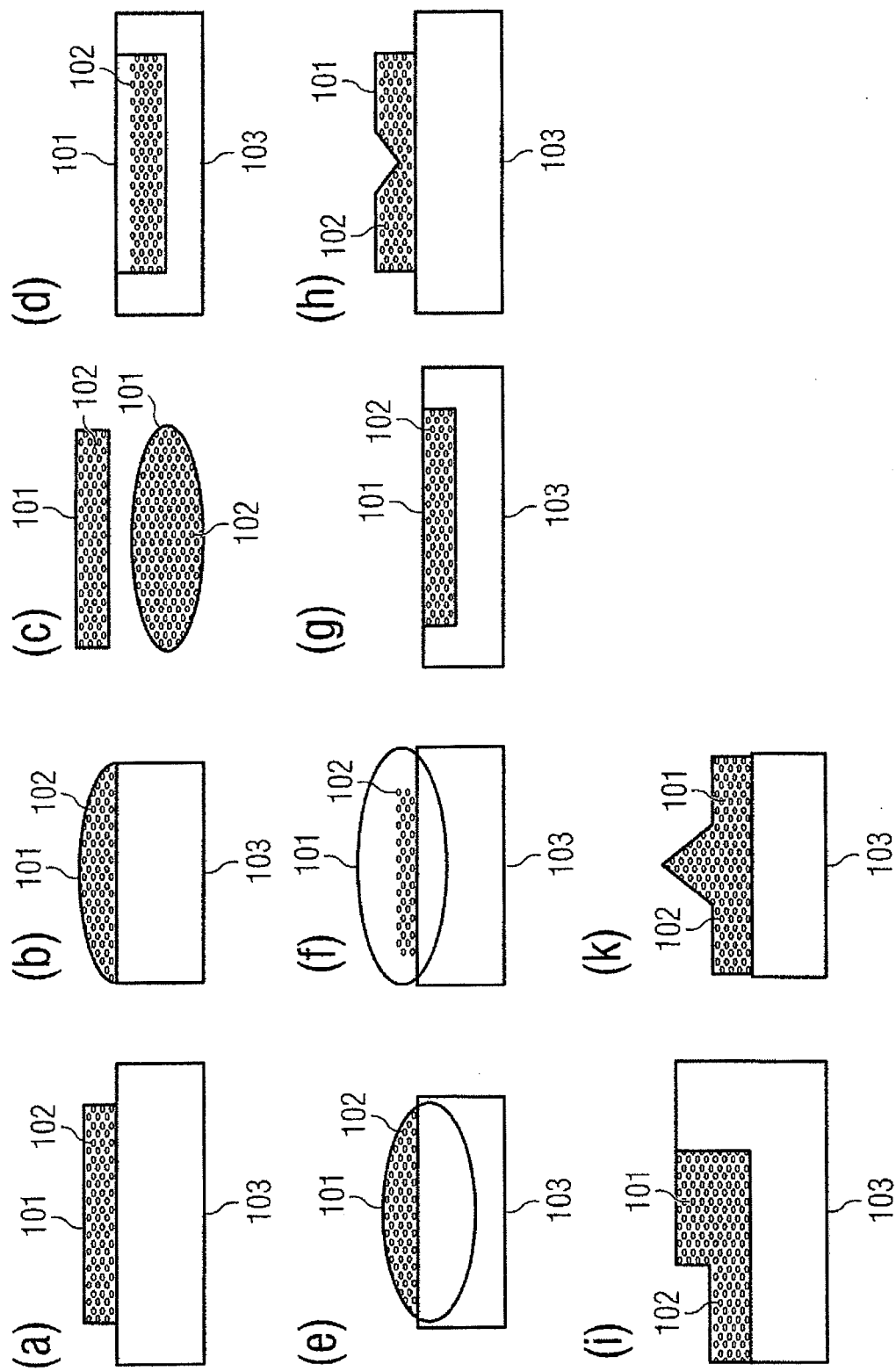
FIG. 1 shows various configurational variants for the form of the alkali-silicate phosphor layer (101) or the phosphor body (101) and for the type and form of the substrate (103) ((a)-(k)).

The present invention is based on the finding that suspensions of solid phosphor particles in liquid aqueous alkali silicate solutions are suitable for forming mechanically stable, hard phosphor layers that at the same time have very good optical characteristics.

In a first aspect, the present invention is therefore directed to a method for producing a phosphor layer or a phosphor body, the method comprising the steps of:
  applying a suspension comprising at least one solid phosphor and at least one alkali silicate to a substrate surface or into a mold to create a phosphor layer or a phosphor body;
  curing the phosphor layer or the phosphor body.

In various embodiments of the invention, the suspension is an aqueous suspension and comprises a mixture of water and at least one liquid alkali silicate. The method may also comprise the step of producing a suitable suspension by suspending the solid phosphor in a liquid solution containing alkali silicate.

For the production of the suspension, the phosphor powders may be mixed with liquid aqueous alkali silicate. In this case, the ratio of the volumes of the alkali silicate fraction, water and solid powder has a direct influence on the homogeneity of the suspension (processability), the viscosity, the resultant layer thickness, the tendency to crack, the drying behavior and the optical characteristics of the resultant layer (later glass fraction).

It has been found to be advantageous if the volume concentration ratio of the liquid alkali silicate and water in such mixtures is from approximately 1:5 to approximately 5:1, preferably from approximately 1:3 to 3:1. In certain embodiments of the invention, the volume concentration ratio of liquid alkali silicate(s) and water is therefore 1:3, 1:2, 2:3, 1:1, 2:1, 3:2 or 3:1. The ratio used may be chosen in dependence on the targeted characteristics of the phosphor layer (for example glass fraction, layer thickness, strength), and on the phosphors themselves. A fraction of pure alkali silicate above the aforementioned concentration range leads to the foaming of the layer during the drying or baking. "Approximately" means in the context of this invention that the corresponding numerical value may deviate upward or downward by about 10%. In one embodiment, the liquid alkali silicate is a saturated solution of alkali silicate in water, which is then further diluted with water in the aforementioned ratio. Such a saturated solution may comprise, for example, 7.5-8.5% by weight of alkali oxide, for example $Na_2O$, and 25.5-28.5% by weight of $SiO_2$ (in each case acidimetrically determined). Such a solution may have a density of about 1.296 to about 1.396 g/ml.

The at least one alkali silicate may be, for example, sodium silicate or potassium silicate. Likewise included are mixtures of the aforementioned alkali silicates. The alkali silicates are compounds of the general formula $M_2O \cdot nSiO_2$, where M is an alkali metal and n is in the range of 1-4. In various embodiments of the present invention, the alkali silicates are used as colloidal, alkaline solutions in water, in particular sodium/potassium silicate solutions. Such aqueous solutions may be produced by dissolving the solid alkali silicate in water at elevated temperature and elevated pressure.

The at least one solid phosphor may be a mixture of two or more different phosphors. In conjunction with the present invention, the term "at least one" means 1 or more, in particular at least 2, 3, 4, 5, 6, 7, 8, 9, 10 or more. The invention therefore also relates to suspensions that comprise 2 or more, for example 2, 3 or 4, different phosphors. The solid phosphor is usually used as a powder. This suspension may be produced, for example, by the solid phosphor being added to a mixture of water and alkali silicate. Suitable phosphors are known in the prior art. Customary phosphors are, for example, silicates, nitrides, oxides, phosphates, borates, oxynitrides, sulfides, selenides, and halides of aluminum, silicon, magnesium, calcium, barium, strontium, zinc, cadmium, manganese, indium, other transition metals, or rare earth metals such as yttrium, gadolinium or lanthanum, which are doped with an activator, such as for example copper, silver, aluminum, manganese, zinc, tin, lead, cerium, terbium, titanium, antinomy or europium. In various embodiments of the invention, the phosphor is an oxidic or (oxy-)nitridic phosphor, such as a garnet, orthosilicate, nitrido(alumo) silicate or nitrido-orthosilicate or a halide or halophosphate. Actual examples of suitable phosphors are strontium chlorapatite: $Eu((Sr,Ca)_5(PO_4)_3Cl; Eu; SCAP)$, yttrium-aluminum-garnet:Cer(YAG:Ce) or $CaAlSiN_3$; Eu.

In various embodiments of the invention, the mass ratio of the phosphor or phosphor mixture to the aqueous, liquid alkali silicate, i.e. the mixture of alkali silicate and water, is therefore from approximately 1:5 to approximately 5:1, preferably from approximately 1:3 to 3:1. Concentration ratios by way of example are therefore 3:1, 2:1, 3:2, 1:1, 2:3, 1:2 or 1:3. These concentration ratios have been found to be particularly favorably processable with regard to the homogeneity of the suspension, sedimentation time and layer thickness.

In various embodiments of the invention, the suspension may also comprise further constituents, for example particles with light-scattering characteristics and/or auxiliaries. Examples of auxiliaries include surfactants and organic solvents. Examples of light-scattering particles are gold, silver and metal oxide particles.

In the methods according to the invention, the application of the suspension to a surface or the introduction into a mold may be performed by pasting, printing, spraying or injecting. To create a phosphor layer, the application process may also comprise spinning and/or ultrasonic treatment.

The substrate to which the phosphor layer is applied may be, for example, a heat sink or an optical component, such as for example a collimator. The substrate may consist of various suitable materials, such as for example plastic, glass, ceramic or metal. To form a phosphor body, molds of the materials mentioned may be used. The phosphor body may be, for example, a phosphor film.

In various embodiments of the invention, the curing of the phosphor layer or the phosphor body is performed by drying. The curing or drying may be performed at room temperature or at elevated temperature, for example 80-150° C. Various curing/drying steps at different temperatures may also be combined with one another. In one embodiment, a drying step at room temperature may be followed by a further drying step at elevated temperature, for example 80 to 150° C. The curing/drying at elevated temperature may be performed, for example, in an oven. Alternatively, the substrate or the mold and/or the phosphor layer/the phosphor body may be heated by means of microwaves or induction techniques. In the production of a phosphor body, after a first drying step it may be released from the mold and then optionally dried further at elevated temperature.

Depending on the phosphor used, the curing/drying may also be performed under shielding gas (for example $N_2$ or Ar) or in a vacuum. This allows avoidance of deactivation of the phosphor by the effect of oxygen at elevated temperature.

A phosphor layer according to the invention can be obtained, for example, by producing a suspension of YAG:Ce as phosphor in a liquid alkali silicate/water mixture (1:1) in a ratio of phosphor to alkali silicate-water mixture of 1:3, application to a substrate, drying at room temperature for 15-30 minutes, and curing in an oven for approximately 1 h at 80° C. and then for about 1 h at about 220° C.

Another phosphor layer according to the invention can be obtained, for example, by producing a suspension of a nitridoorthosilicate as phosphor in a liquid alkali silicate/water mixture (1:1) in a ratio of phosphor to alkali silicate/water mixture of 2:3, application to a substrate, drying at room temperature for 15-30 minutes, and curing in an oven for about 1 h at 80° C. and then for 2-3 h at 150° C.

With the method according to the invention of binding phosphors using alkali silicates, very hard, mechanically stable phosphor layers can be created, the binder of which in the case of many phosphors does not interact with the phosphors in the range of its working temperature, is optically transparent and spectrally and thermally stable. It can be used to produce both thin phosphor layers on substrate surfaces with layer thicknesses between 50 and 200 µm and unbonded phosphor platelets or three-dimensional bodies (optical components) of greater extent (several mm). Possible configurational variants with differing forms of the phosphor layer (101) and/or the substrate (103) and distribution of the phosphor particles (102) are represented in FIG. 1. However, the invention is not restricted to the configurational variants that are represented.

Figure 2:
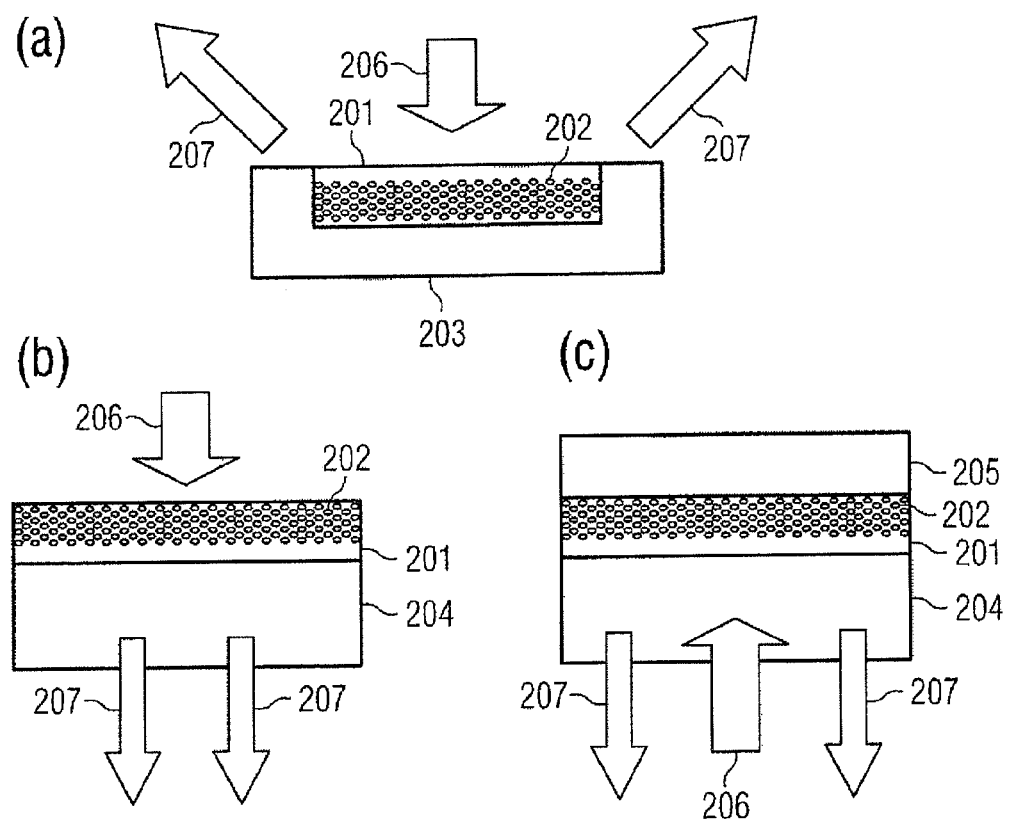
FIG. 2 shows the use of the phosphor layers (201) according to the invention in reflection (a) and transmission (b) applications and also an embodiment in which the phosphor layer (201) is used reflectively and is bonded (c) directly between the optically dense heat sink (205) and the transparent optical component (204). The excitation light is represented as a wide arrow (206), the emitted light as narrow arrows (207). The substrate (203) is optically dense in FIG. 2a), optically transparent in FIG. 2b).

In a way corresponding to the configuration of the layers (layer thickness, glass fraction), the phosphor layers (201) may be used with phosphor particles (202) in transmission with a transparent substrate (204) or in reflection with an optically dense substrate (203), as represented in FIG. 2. FIG. 2 also shows a configurational variant in which the phosphor layer (201) is bonded directly onto the optical system between a transparent component (204), for example an optical component, and a heat sink (205).

Figure 3:
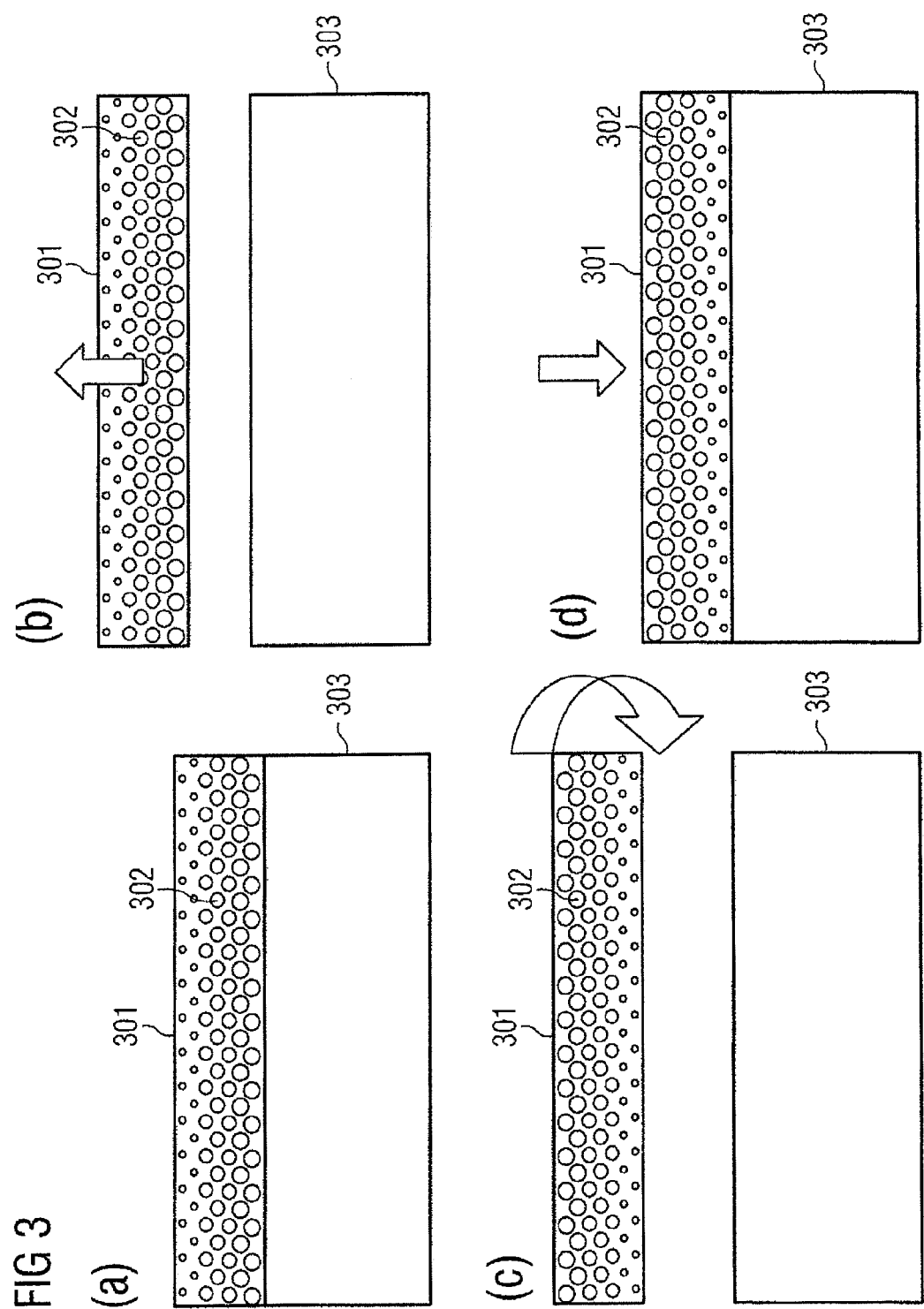
FIG. 3 schematically shows a phosphor layer (301) with a distribution of particles (302) (a), which are detached from the underlying substrate (303) (b), turned by 180° (c) and adhesively attached again to the substrate surface (d). This allows an optical component in which the larger phosphor particles lie at the surface of the layer to be produced. The substrate (303) is optically dense in FIGS. 3a) to 3d).

To make the conversion of excitation light into emitted light as efficient as possible, the scattered light fraction of the excitation light must be minimized as much as possible. This may take place, for example, by light coupling to phosphor particles that are as large as possible. In principle, the particle sizes of the phosphors can be set and selected in a certain range by corresponding processing processes (grinding). In practice, however, there are always grain size distributions. Within suspensions, the larger and heavier particles settle first, the smaller and lighter ones later, so that, after a certain time (dependent among other factors on the viscosity of the liquid and the particle sizes), a gravitationally driven particle size distribution occurs (small particles at the upper surface of the layer, larger particles below). The aqueous alkali silicate solution may be used, for example, for setting a particle size distribution during the application process and curing by single or repeated turning of the substrate. Alternatively or in addition, the particle size distribution may be set by a centrifuge. After the drying and baking, the phosphor layer (301) with the phosphor particles (302) can be detached from the carrying medium (303), turned by 180° and applied again, with the optically more favorable, coarser grain distribution upward, to a substrate (303), for example by adhesive bonding with alkali silicate. Such a method is schematically represented in FIG. 3.

Alternatively, the particle distribution may be influenced by an ultrasonic treatment. In this case, for example, coarser phosphor particles may be shaken to the surface of the layer by means of ultrasound.

The invention likewise relates to an optical component comprising a phosphor layer produced by the method according to the invention. The phosphor layer or the optical component may also be component parts of a lamp, in particular an LED lamp, a laser or a color wheel.

In a still further aspect, the invention relates to a suspension which comprises at least one liquid aqueous alkali silicate and one or more solid phosphors. The volume concentration ratio of the liquid alkali silicate and the mass ratio of the liquid alkali silicate/water mixture and phosphor (mixture) may in this case be as specified above in conjunction with the method according to the invention. The alkali silicate and phosphor may in this case likewise be as defined above.

The suspension may also comprise further constituents, such as for example particles with light-scattering characteristics or auxiliaries.

In addition, the invention is also directed to the use of the suspension according to the invention for forming a phosphor layer on a substrate surface or for forming a phosphor body.

The phosphor layers produced with the method according to the invention or the suspension according to the invention may be used in an advantageous way in lamps or LEDs, in particular in so-called remote phosphor applications, in which the phosphor is spatially separate from the excitation light source.

By virtue of the use of alkali silicate as a thermally and chemically inert and spectrally stable binder, phosphor layers produced according to the invention are mechanically and thermally very stable and can increase the power densities of the excitation light.

Furthermore, the phosphor layers produced according to the invention are distinguished by good optical characteristics.

The use of alkali silicate as a binder additionally makes it possible to improve the optical bonding to the surroundings, since the coupling in or out of light and emission characteristics (lens effect) can be influenced by the forming of the phosphor layer (for example during production by the use of molds or subsequently by machining).

The phosphor layers produced by means of the method according to the invention may be used reflectively or transmissively, depending on the ratio of the alkali silicate and phosphor fraction (FIG. 3). Furthermore, a direct optical bonding to the optical elements is possible (FIG. 3).

The production method according to the invention is comparatively simple and, on account of the low processing temperatures, is largely independent of the substrate material (metals, glasses, ceramics, plastics).

The low viscosity of the liquid of the suspension also allows the grain size distribution at the surface of the phosphor to be influenced, for example by gravitationally or ultrasonically driven particle selection (FIG. 3).

To obtain further improvement of the optical characteristics of the phosphor layers, optical glass coating methods may also be used (for example antireflection coating, dichroic or filter layers).

The great hardness and very good mechanical stability of the phosphor layers produced according to the invention allows greater freedoms in the design of phosphor-based products, for example higher power densities in the phosphor excitation and static variants (elimination of color wheel solutions), the production of substrate-independent phosphor platelets or films, which can be used in a self-supporting manner or subsequently adhesively attached to substrates (for example with alkali silicate, see also FIG. 4), the production of three-dimensional structures and bodies, for example optical components.

In addition, the phosphor layers or phosphor bodies produced according to the invention can be finished by machining processes. For example, the phosphor surface may be structured, for example provided with holes or grooves (FIG. 1(h)), or a deliberate roughening of the surface may be performed. That leads to more effective removal of heat and reduction of the power densities by increasing the surface area.

Figure 4:
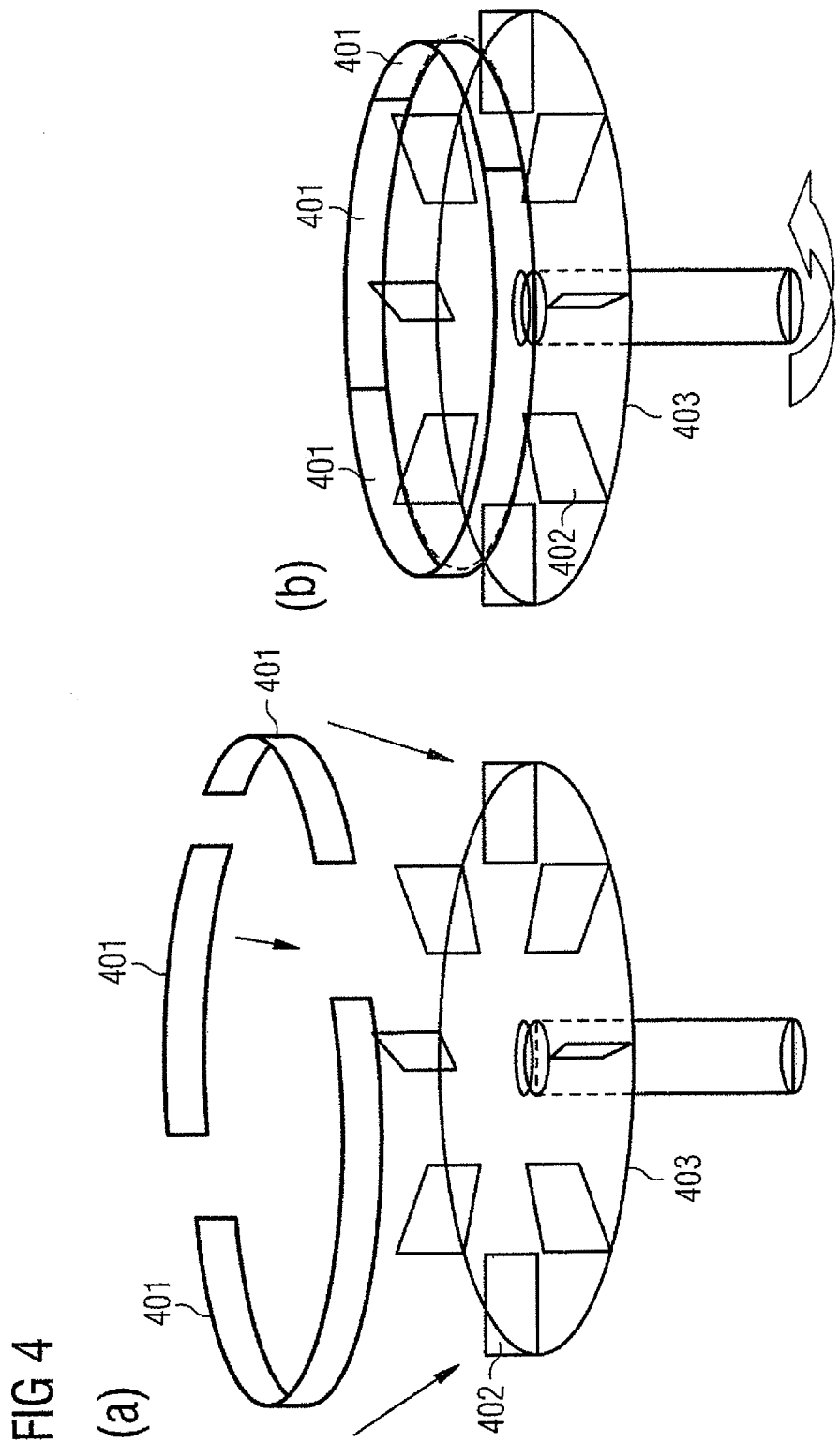
FIG. 4 schematically shows an example of an embodiment in which a number of substrateless phosphor layers are placed as color wheel segments (401) onto fan vanes (402), to achieve active cooling in a way corresponding to the radial fan principle.
Figure 5:
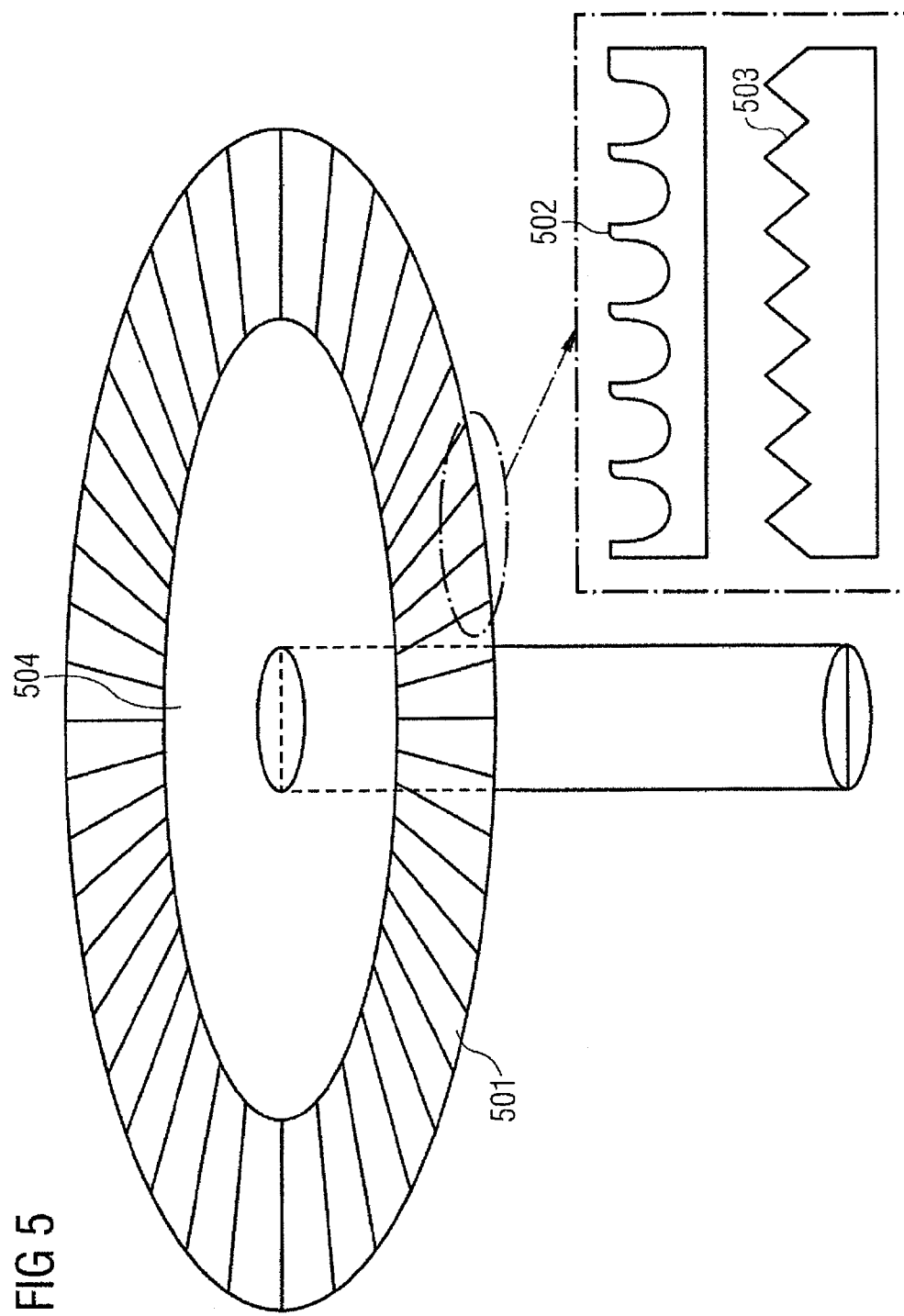
FIG. 5 schematically shows an example of an embodiment in which the phosphor layer (501) is used on a color wheel (504) and can be actively cooled by surface structures in the phosphor layer. Represented by way of example, and as alternatives, of surface structures are ridges (502) and lamellae (503).

Conceivable in this respect are, for example, self-supporting variants for cooling the underside of the phosphor (FIG. 4) or active cooling by grooves or ridge structures in the phosphor layer (FIG. 5).

The present invention consequently also relates to an embodiment of a color wheel (403) in which, according to the invention, one or more phosphor layers (401) is or are detached from its/their substrate and placed onto radially arranged fan vanes (402) on the surface of a rotatable wheel and secured, for example adhesively bonded. The desired form of the phosphor layers can in this case be obtained directly during production or by subsequent mechanical shaping. Such a color wheel is schematically represented in FIG. 4.

In another embodiment, the invention relates to a color wheel (504) to which a phosphor layer (501) produced according to the invention is applied or is created directly on the surface of the color wheel as a substrate, the phosphor layer being provided with a surface structure for the purpose of cooling. The surface structure may take the form of ridges (502) or lamellae (503). Such a color wheel is schematically represented in FIG. 5.

The invention is described herein by reference to specific embodiments, but is not restricted to them. In particular, it is quite evident to a person skilled in the art that various adaptations can be made to the described invention without departing from the spirit and scope of the invention as determined by the appended patent claims. The scope of the invention is consequently determined by the patent claims and it is intended that the invention comprises all modifications and adaptations that are within the range of interpretation and equivalence of the claims.

The invention claimed is:

1. A method for producing a phosphor layer or a phosphor body, comprising:
    applying a suspension comprising at least one solid phosphor and at least one alkali silicate to a substrate surface or into a mold to create a phosphor layer or a phosphor body; and
curing the phosphor layer or the phosphor body, the mass ratio of the alkali silicate and phosphor being from approximately 1:5 to approximately 5:1.

2. The method as claimed in claim 1, the suspension also comprising water.

3. The method as claimed in claim 2, the volume concentration ratio of the alkali silicate and water being from approximately 1:5 to approximately 5:1.

4. The method as claimed in claim 1, the alkali silicate being sodium silicate, potassium silicate or a mixture thereof.

5. The method as claimed in claim 1, the application of the suspension being performed by pasting, printing, spraying or injecting.

6. The method as claimed in claim 1, the application of the suspension to create a phosphor layer including spinning or ultrasonic treatment.

7. The method as claimed in claim 1, the substrate being a heat sink or an optical component.

8. The method as claimed in claim 1, the substrate or the mold consisting of glass, ceramic or metal.

9. The method as claimed in claim 1, the curing being performed by drying.

10. The method as claimed in claim 1, the curing being performed at elevated temperature.

11. An optical component comprising or consisting of a phosphor layer produced by a method according to claim 1.

12. A lamp comprising a phosphor layer produced by a method according to claim 1.

13. A lamp comprising an optical component according to claim 11.

* * * * *